United States Patent
Wright et al.

(10) Patent No.: US 6,819,539 B1
(45) Date of Patent: Nov. 16, 2004

(54) METHOD FOR CIRCUIT RECOVERY FROM OVERSTRESS CONDITIONS

(75) Inventors: David G. Wright, Woodinville, WA (US); Timothy J. Williams, Bellevue, WA (US)

(73) Assignee: Cypress Semiconductor Corp., San Jose, CA (US)

( * ) Notice: Subject to any disclaimer, the term of this patent is extended or adjusted under 35 U.S.C. 154(b) by 0 days.

(21) Appl. No.: 09/933,254

(22) Filed: Aug. 20, 2001

(51) Int. Cl.$^7$ ................................................ H02H 3/24
(52) U.S. Cl. ....................................................... 361/90
(58) Field of Search .............................. 361/86, 87, 90, 361/91.1, 93.1, 93.9

(56) References Cited

U.S. PATENT DOCUMENTS

| | | | |
|---|---|---|---|
| 4,099,068 A | 7/1978 | Kobayashi et al. ..... | 307/200 A |
| 4,245,150 A | 1/1981 | Driscoll et al. .......... | 235/92 FP |
| 4,367,422 A | 1/1983 | Leslie ........................ | 307/597 |
| 4,367,423 A | 1/1983 | Hornung .................... | 307/597 |
| 4,394,702 A | 7/1983 | Boothe ....................... | 361/92 |
| 4,422,163 A | 12/1983 | Oldenkamp ................ | 365/229 |
| 4,428,020 A | 1/1984 | Blanchard, Jr. ............ | 361/90 |
| 4,429,236 A | 1/1984 | Nitschke .................... | 307/362 |
| 4,433,390 A | 2/1984 | Carp et al. .................. | 364/900 |
| 4,434,403 A | 2/1984 | Chang ........................ | 328/120 |
| 4,473,459 A | 9/1984 | Bose et al. ............... | 208/8 LE |
| 4,493,000 A | 1/1985 | Edwards ..................... | 361/92 |
| 4,581,552 A | 4/1986 | Womack et al. ........... | 307/594 |
| 4,607,178 A | 8/1986 | Sugie et al. ................ | 307/594 |
| 4,788,454 A | 11/1988 | Tanagawa et al. ...... | 307/296 R |
| 4,788,462 A | 11/1988 | Vesce et al. ................ | 307/597 |
| 4,879,623 A | 11/1989 | Baumgartner et al. ........ | 361/33 |
| 4,902,910 A | 2/1990 | Hsieh ....................... | 307/296.4 |
| 5,111,067 A | 5/1992 | Wong et al. ............. | 307/272.3 |
| 5,207,006 A | 5/1993 | Sharpe et al. ................ | 33/573 |
| 5,256,914 A | * 10/1993 | Boomer ....................... | 326/29 |
| 5,280,108 A | 1/1994 | Fanning .................... | 530/387.7 |
| 5,313,112 A | 5/1994 | Macks ...................... | 307/296.3 |
| 5,341,268 A | 8/1994 | Ishiguro et al. ............... | 361/62 |
| 5,457,414 A | 10/1995 | Inglis et al. ................... | 327/77 |
| 5,543,741 A | 8/1996 | Purits ......................... | 327/143 |
| 5,723,958 A | 3/1998 | Boll et al. ................. | 318/432 |
| 5,758,053 A | 5/1998 | Takeuchi et al. ........ | 395/182.02 |
| 6,112,136 A | 8/2000 | Paul et al. .................. | 700/293 |
| 6,118,622 A | * 9/2000 | Gill .............................. | 360/66 |
| 6,259,371 B1 | 7/2001 | Chang ........................ | 340/659 |
| 6,369,427 B1 | 4/2002 | Williamson ................ | 257/355 |
| 6,438,462 B1 | 8/2002 | Hanf et al. ................. | 700/297 |
| 6,441,675 B1 | 8/2002 | Dishongh et al. .......... | 327/525 |

OTHER PUBLICATIONS

"A Quick Response Peak Detector for Variable Frequency Three–Phase Sinusoidal Signals", By Ching–Tsai Pan et al., IEEE Transactions on Industrial Electronics, vol. 41, No. 4, Aug. 1994, pp. 434–440.

(List continued on next page.)

Primary Examiner—Adolf Berhane
(74) Attorney, Agent, or Firm—Christopher P. Maiorana, P.C.

(57) ABSTRACT

A method for circuit recovery from overstress conditions, comprising the steps of (A) detecting an event and (B) resetting a device when the event is a first predetermined type and providing recovery when the event is a second predetermined type.

14 Claims, 5 Drawing Sheets

OTHER PUBLICATIONS

"Design Considerations for Low–Voltage On–Board DC/DC Modules for Next Generations of Data Processing Circuits", By Michael T. Zhang et al., IEEE Transactions on Power Electronics, vol. 11, No. 2, Mar. 1996, pp. 328–337.

"Analog Fault Diagnosis Based on Ramping Power Supply Current Signature Clusters", By Shyam S. Somayajula et al., IEEE Transactions on Circuits and Systems—II: Analog and Digital Processing, vol. 43, No. 10, Oct. 1996, pp. 703–712.

"Design Strategies and Decoupling Techniques for Reducing the Effects of Electrical Inteference in Mixed–Mode IC's", By Mark Ingels et al., IEEE Journal of Solid–State Circuits, vol. 32, No. 7, Jul. 1997, pp. 1136–1141.

"Active Feedback Circuit for Minimization of Voltage Transients During Pulsed Measurements of Semiconductor Devices", By Albert M. Young et al., IEEE Transactions on Instrumentation and Measurement, vol. 50, No. 1, Feb. 2001, pp. 72–76.

"Low–Voltage Power System Surge Overvoltage Protection", By Dev. Paul, IEEE Transactions on Industry Applications, vol. 37, No. 1, Jan./Feb. 2001, pp. 223–229.

* cited by examiner

METHOD FOR CIRCUIT RECOVERY FROM OVERSTRESS CONDITIONS

FIELD OF THE INVENTION

The present invention relates to a method and/or architecture for implementing microcontrollers and systems that execute firmware generally and, more particularly, to a method and/or architecture for recovery from circuit stress conditions in a microcontroller.

BACKGROUND OF THE INVENTION

Conventional approaches to robust operation in the presence of severe environmental stresses include specifying high device immunity to stress conditions. While elecrostatic discharge (ESD) immunity levels are typically specified for all parts, they do not provide robust operation in the presence of all stress conditions. ESD tests normally provide immunity for powered off conditions (i.e., protection during handling), and as a natural consequence, provide protection during some operation stresses (i.e., over/under voltages or currents). However, the trip level of ESD protection may not prevent other modes of failure that occur at lower levels. For example, an ESD protection circuit may trip at 8V overstress on the pin of a 5V part. However, the ESD protection circuit will not trip for a 7V overstress that allows a hazardous noise glitch. Additional devices are implemented to increase noise immunity (i.e., adding bypass capacitors to relevant signals) that have associated cost and space penalties.

Other conventional approaches include watchdog reset circuits to reset a device that is no longer in the normal operating mode. Watchdog reset circuits can allow recovery from a fault condition caused by an overstress. Watchdog reset circuits are effective in cases of significant failure that places the device in a recognized fault mode. Such resets occur when program code is vectored to an illegal location, which causes code execution to halt until the watchdog reset occurs.

However, a stress condition can cause faulty operation that is not recognizable by the watchdog reset device. For example, a device can vector to an unintended part of code, resulting in faulty operation. The device can continue to operate within legal parts of the code and is unable to detect that a problem has occurred. In another example, corruption of memory (i.e., RAM) that occurs during an event is undetected and causes failure at another event.

SUMMARY OF THE INVENTION

The present invention concerns a method for circuit recovery from overstress conditions, comprising the steps of (A) is detecting an event and (B) resetting a device when the event is a first predetermined type and providing recovery when the event is a second predetermined type.

The objects, features and advantages of the present invention include providing a method and/or architecture for implementing microcontrollers and systems that execute firmware to provide recovery from stress conditions that may (i) detect over-stresses to increase the robustness of device operation, (ii) implement a device that may either directly reset itself or monitor itself and take appropriate recovery action when stress conditions occur, (iii) provide flexibility in response to stress conditions, (iv) call for a quick and complete reset after stress conditions, (v) perform self checking, issue warnings, perform back-up operations, shut-down, or other recovery steps before or in place of a full reset in response to a predetermined criteria, (vi) register and monitor stress conditions, and/or (vii) allow a device to take any appropriate action when stress conditions are occurring.

BRIEF DESCRIPTION OF THE DRAWINGS

These and other objects, features and advantages of the present invention will be apparent from the following detailed description and the appended claims and drawings in which:

FIGS. 1(a–b) are flow charts illustrating preferred embodiments of the present invention;

FIGS. 3(a–c) are block diagrams of overvoltage detect circuit;

DETAILED DESCRIPTION OF THE PREFERRED EMBODIMENTS

Figure 1A:
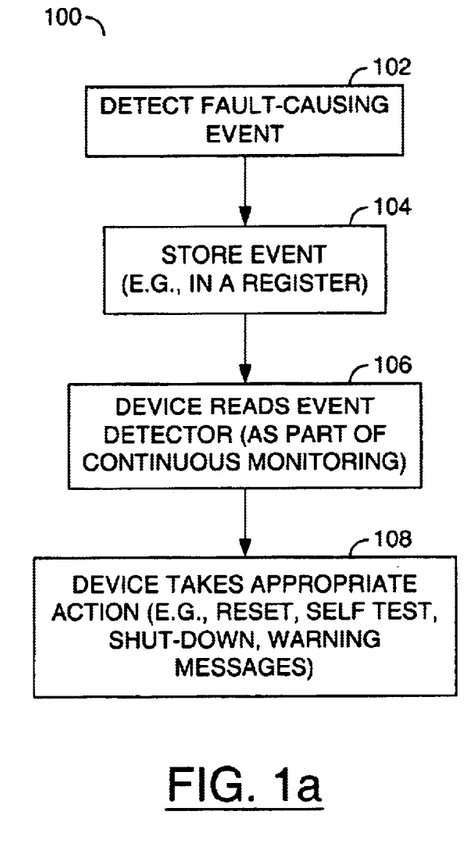
Figure 1B:
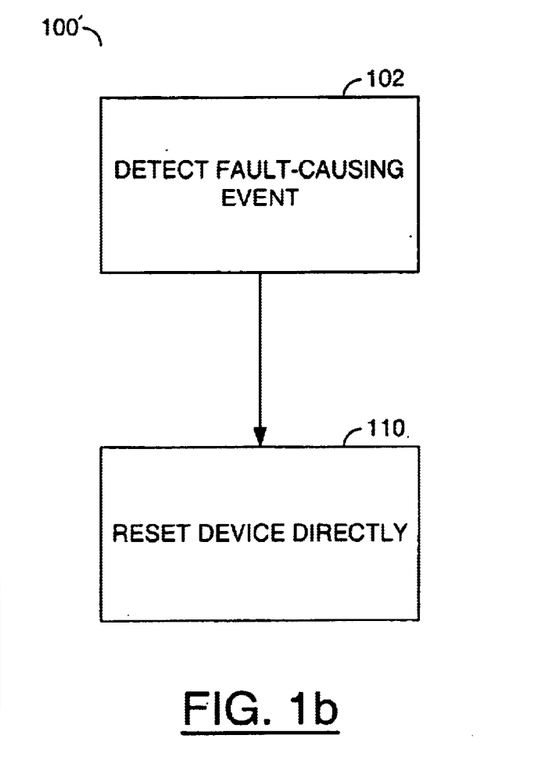

Referring to FIGS. 1a and 1b, a block diagram of a process (or method) 100 is shown in accordance with a preferred embodiment of the present invention. The process 100 may allow recovery from circuit stress conditions (or events) that may cause a device to stop operating properly. In particular, the process 100 may apply to microcontrollers and systems that execute firmware to provide recovery from overstress conditions (to be described in connection with FIG. 2). Stress conditions include those covered by industry standard tests for electrostatic discharge (ESD), electrical fast transient/burst (EFTB), radiated EMI, and operation in severe environments where significant noise coupling may occur and upset the operation of an electronic device. The process 100 may allow devices to detect stress events and take appropriate action (e.g., initiating a reset or recovery routine) to recover from possible undesirable effects. The circuit 100 may also be configured to detect and recover from an undesired voltage drop in a system (e.g., grounding of a power line). Such a fault condition typically causes large current to flow in the system, resulting in detectable differences between two points in a supply (e.g., a ground signal or a power signal).

FIG. 1a illustrates the process 100 comprising a state 102, a state 104, a state 106 and a state 108. While in the state 102, the process 100 may detect fault causing conditions (e.g., a fault causing event may occur). The process 100 may then continue to the state 104. While in the state 104, the process 100 may store the event. In one example, the event may be stored in a register (not shown). The process 100 may then proceed to the state 106. While in the state 106, the process 100 may read an event detector (e.g., an event table) to determine a type of event. The process 100 may read the event detector (or table) as part of a continuous monitoring process. The process 100 may then continue to the state 108. While in the state 108, the process 100 may take appropriate action (e.g., a particular action in response to a particular event type). For example, one case of an event may call for a quick and complete reset after stress events, while another case of an event may perform self checking, issue warnings, perform back-up operations, shut-down, or other recovery steps may be implemented before or in place of a full reset.

The process 100 may detect (e.g., the state 102) and store (e.g., the state 104) the occurrence of an overstress condition. The process 100 may allow events that cause faulty operation to be detected, that would otherwise go undetected. The process 100 may then provide fault operation recovery. The process 100 may detect and recover from stress events as well as provide fault operation detection. For example, the process 100 may detect an overstress event and store the fault causing event occurrence for later action. The fault causing event may then be recognized and appropriate action may be taken for device recovery.

FIG. 1b illustrates another preferred embodiment 100' of the present invention. At the state 102, the process 100' may detect a fault causing event. The process 100' may then proceed to a state 110. At the state 110, the process 100' may perform a direct device reset. The process 100' may be less flexible than the process 100. However, the process 100' may be applicable when monitoring for fault conditions is not available (e.g., no system processor), or where fault conditions are generally known to need a device reset (e.g., other prior responses are not needed).

Figure 2:
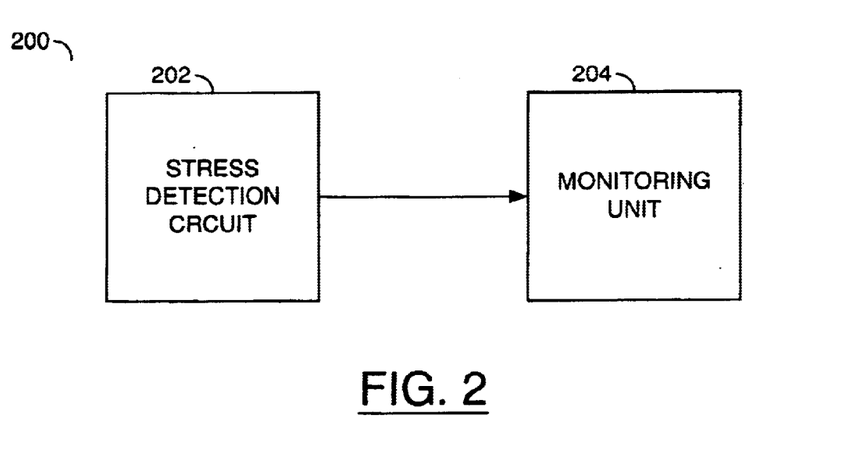
FIG. 2 is a block diagram illustrating an exemplary implementation of the present invention.

Referring to FIG. 2, a system (or a circuit) 200 is shown illustrating an exemplary implementation of the present invention. The circuit 200 generally comprises a stress detection circuit 202 and a monitoring circuit 204. In one example, the monitoring circuit 204 may be implemented as a processor. In another example, the monitoring circuit 204 may be implemented as a microcontroller or other processing device. The microcontroller 204 may implement the states 102, 104 and 106 of FIG. 1a.

Detection of over/under-voltage typically occurs on an Ad input pin. Over/under-voltages may result from ESD events, or other transient events generally tested for by the EFTB test. For example, in the EFTB test, a fast, high voltage transient is coupled onto either a power line or device cables of a tested system. Such events provide a variety of possibilities for failure in a device. Determining the exact subsequent corruption or failure with certainty is generally difficult. The process 100 may register the presence of such an event and respond by taking appropriate action.

Figure 3A:
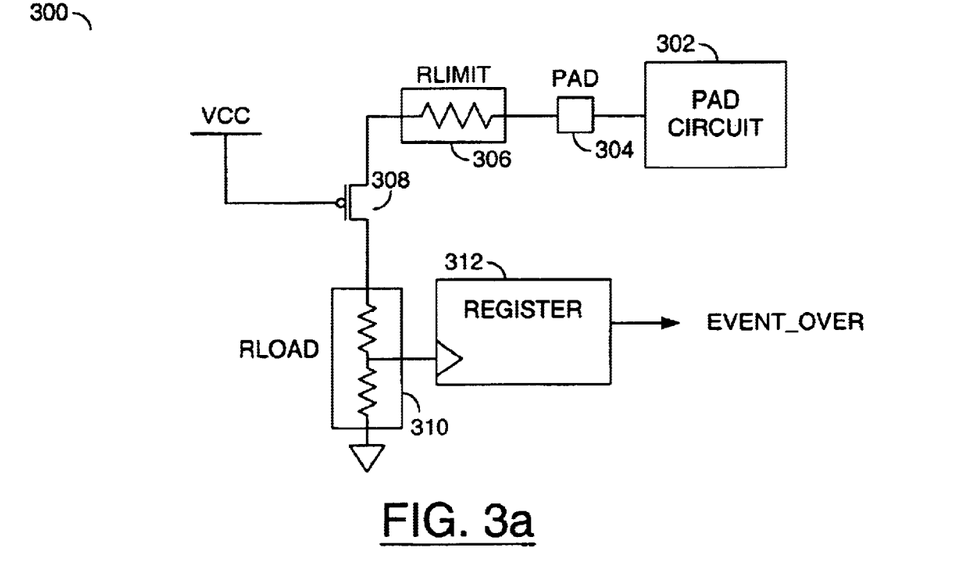
Figure 3B:
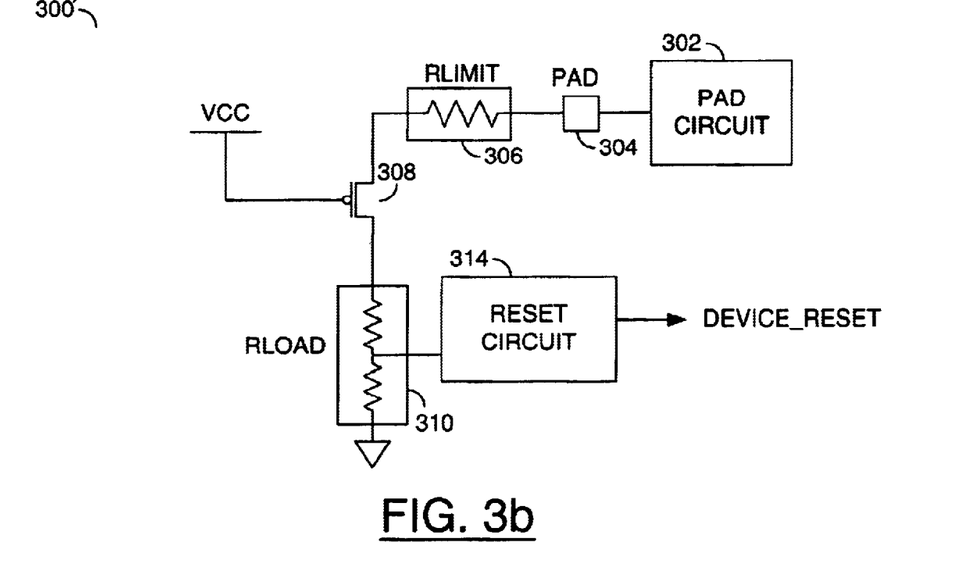
Figure 3C:
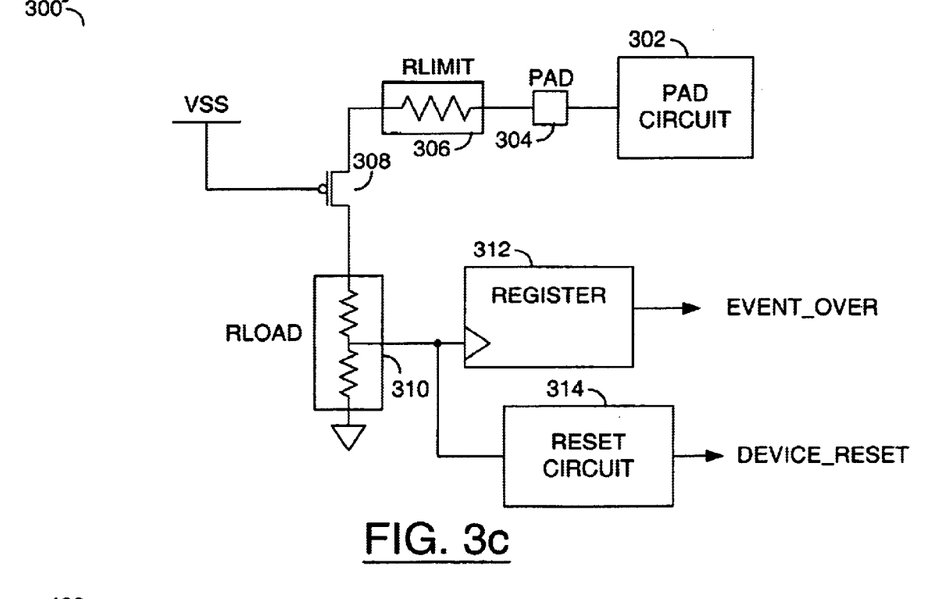

Referring to FIGS. 3 (a–c), a circuit (or system) 300 for detecting over-voltages in a typical CMOS process (e.g., excursions beyond a positive supply) is shown. However, other processes may be implemented accordingly to meet the design criteria of a particular implementation. FIG. 3a illustrates the circuit 300 comprising a pad circuit 302, a pad 304 a resistance block 306, a transistor 308, a resistance block 310 and a register 312. The resistance block 306 may have a predetermined resistance value (e.g., RLIMIT). The resistance block 310 may have a predetermined resistance value (e.g., RLOAD). While the transistor 308 is shown as a PMOS device, an NMOS device may be implemented with an appropriate adjustment to the signal before being presented to the gate of the transistor 308 (to be discussed in more detail in connection with FIG. 4).

The pad circuit 302 may be coupled to the pad 304. The pad 304 may be coupled to an external device (not shown). The pad 304 may also be coupled to a first side of the resistance block (RLIMIT) 306. A second side of the resistance block (RLIMIT) 306 may be coupled to a source of the transistor 308. A gate of the transistor 308 may be coupled to a power supply (e.g., VCC). A drain of the transistor 308 may be coupled to a first side of the resistance block (RLOAD) 310. A second side of the resistance block (RLOAD) 310 may be coupled to ground. The resistance block (RLOAD) 310 may also be coupled to the register 312. The register 312 may be clocked by the resistance circuit (RLOAD) 310. The register 312 may be configured to generate (and/or store) a signal (e.g., EVENT_OVER). The signal EVENT_OVER may be configured as a fault causing event signal. In one example, the signal EVENT_OVER may be configured as an over-voltage event signal.

The transistor 308 may remain OFF until a voltage of the pad 304 rises above the VCC voltage. When the pad voltage is approximately a PMOS threshold above VCC, current may flow in the from the pad, through the transistor 308 to ground. The resistance block (RLOAD) 310 may be implemented to develop a voltage from the current. In one example, the resistance block (RLOAD) 310 may be implemented as a single resistor or combination of resistors. In another example, the resistance block (RLOAD) 310 may be implemented as an inductor configured to generate a voltage pulse in response to a current pulse. The resistance block (RLOAD) 310 may then provide a pulse to trigger the event detect register 312. The output EVENT_OVER of the register 312 may then be available for monitoring. In one example, the register 312 may be implemented as a flip-flop memory element. In another example, the register 312 may be implemented as a latch element, a memory cell, a non-volatile memory, or a flash memory. However, the register 312 may be implemented as another appropriate type device in order to meet the criteria of a particular embodiment. Optionally, a device for clearing the register 312 may be included to allow detection of subsequent events.

The resistance block (RLIMIT) 306 may be optionally implemented. The current limiting element RLIMIT 306 may be implemented to protect the transistor 308 from damage. The current limiting element RLIMIT 306 may reduce the sensitivity of the circuit 300. However, such an implementation may be both advantageous (e.g., to avoid tripping on smaller, non-hazardous events) and disadvantageous (e.g., difficult to trip on the fault causing events).

FIG. 3b illustrates a circuit 300' that may be similar to tip the circuit 300. The circuit 300' may be implemented without the register 312 (of FIG. 3a). However, the circuit 300' may implement a reset circuit 314. The reset circuit 314 may generate (and/or store) a signal (e.g., DEVICE_RESET). The reset circuit 314 may be implemented as a storage type circuit or other appropriate circuit to meet the criteria of a particular implementation. FIG. 3c illustrates a circuit 300" that may be similar to the circuits 300 and 300' . The circuit 300" may comprise the register 312 and the reset circuit 314. The circuit 300 may illustrate an implementation of the process 100 (of FIG. 1a). The circuit 300' may illustrate an implementation of the process 100' (of FIG. 1b). The circuit 300" may illustrate an implementation of the process 100 (of FIG. 1a) and the process 100' (of FIG. 1B).

Figure 4:
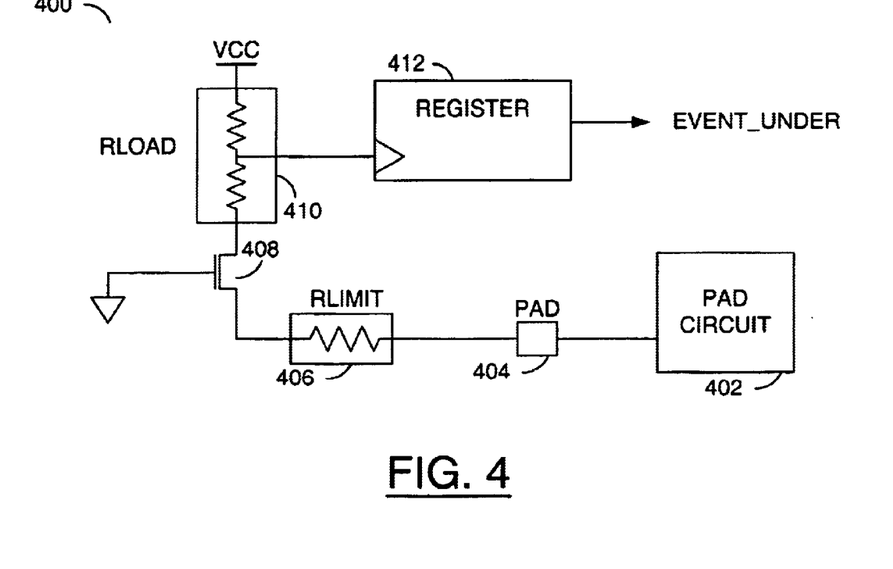
FIG. 4 is a block diagram of an undervoltage detect circuit.

Referring to FIG. 4, a circuit (or system) 400 for detecting under-voltages (e.g., excursions beyond a negative supply) is shown. The circuit 400 generally comprises a pad circuit 402, a pad 404 a resistance block 406, a transistor 408, a resistance block 410 and a register 412. The resistance block 406 may have a predetermined resistance value (e.g., RLIMIT). The resistance block 410 may have a predetermined resistance value (e.g., RLOAD).

The pad circuit 402 may be coupled to the pad 404. The pad 404 may be coupled to an external device (not shown). The pad 404 may also be coupled to a first side of the resistance block (RLIMIT) 406. A second side of the resistance block (RLIMIT) 406 may be coupled to a drain of the transistor 408. A gate of the transistor 408 may be coupled to a ground supply. A source of the transistor 408 may be coupled to a first side of the resistance block (RLOAD) 410. A second side of the resistance block (RLOAD) 410 may be coupled to the power supply (e.g., GND). The resistance block (RLOAD) 410 may also be coupled to the register 412. The register 412 may be clocked by the resistance circuit (RLOAD) 410. The register 412 may be configured to generate (and/or store) a signal (e.g., EVENT_UNDER). The signal EVENT_UNDER may be configured as a fault causing event signal. In one example, the signal EVENT_UNDER may be configured as a under-voltage event signal. The circuit 400 may operate similarly to the circuit 300, where the NMOS device 400 may remain off, until an under-voltage event sufficiently below ground voltage causes current flow, setting the output EVENT_UNDER.

Figure 5:
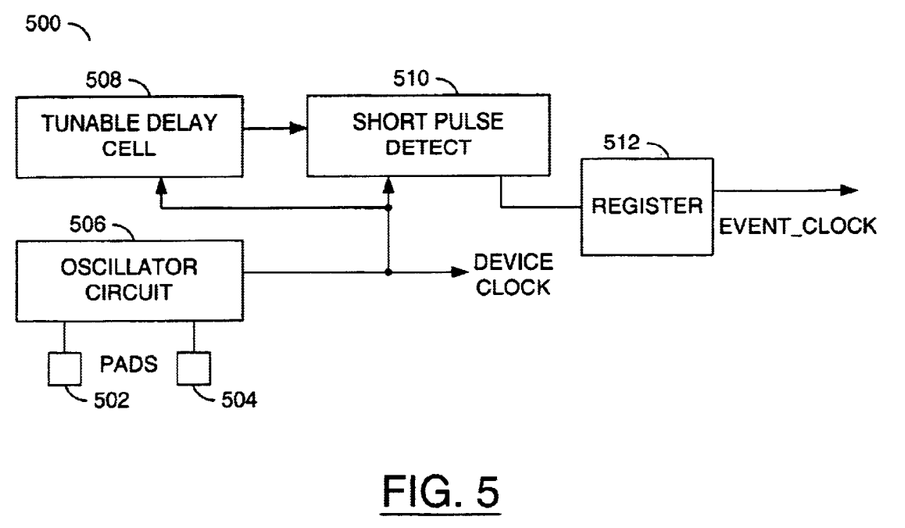
FIG. 5 is a block diagram of a short pulse detect circuit implemented in connection with the present invention.

Referring to FIG. 5, a circuit (or system) 500 illustrating detection of a noise coupling event is shown. A stress event, such as ESD, may cause circuit malfunction by coupling noise onto a critical node, with or without an over/under-voltage. For example, a clock oscillator signal may couple noise such that it appears to have additional, unwanted transitions. Such a case may lead to circuit failure if a clock period becomes insufficiently short for circuit delays to complete as needed within each clock cycle. The circuit 500 may implement a timing element tuned to an average value of a clock to detect a shortened clock pulse. The circuit 500 generally, comprises a pad 502, a pad 504, an oscillator circuit 506, a tunable delay circuit 508, a short pulse detect circuit 510 and a register 512.

The pad 502 and the pad 504 may be coupled to the oscillator circuit 506 and an external device (not shown). For example, the pad 502 may be coupled to a crystal. The oscillator circuit 506 may be configured to generate a signal (e.g., DEVICE_CLOCK). The signal DEVICE_CLOCK may be presented to the tunable delay circuit 508 and the short pulse detect circuit 510. The tunable delay circuit 508 may be configured to present a signal to the short pulse detect circuit 510. The short pulse detect circuit 510 may then present a signal to the register 512 in response to the tunable delay circuit 508 and the signal DEVICE_CLOCK. The short pulse detect circuit 510 may be configured to clock the register 512. The register 512 may generate a signal (e.g., EVENT_CLOCK). The signal EVENT_CLOCK may indicate additional transitions of the system clock DEVICE_CLOCK.

Figure 6:
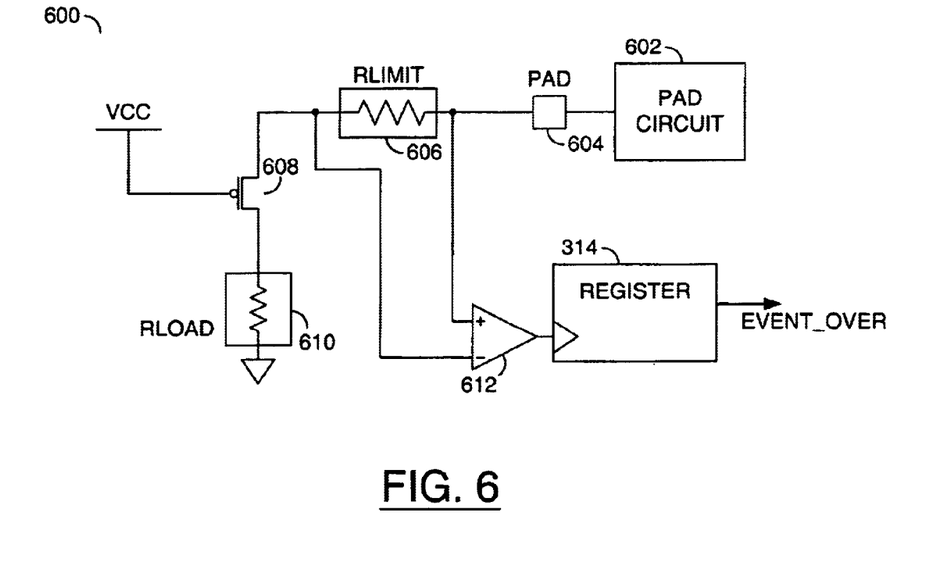
FIG. 6 is a block diagram of an overvoltage detect circuit with a differential amplifier.

Referring to FIG. 6, a circuit (or system) 600 configured to detect over-voltage is shown. The circuit 600 may be similar to the circuit 300. However, the circuit 600 may be implemented using a differential amplifier. The circuit 600 generally comprises a pad circuit 602, a pad 604 a resistance block 606, a transistor 608, a resistance block 610, an amplifier 612 and a register 614. The resistance block 606 may have a predetermined resistance value (e.g., RLIMIT). The resistance block 610 may have a predetermined resistance value (e.g., RLOAD).

The pad circuit 602 may be coupled to the pad 604. The pad 604 may be coupled to an external device (not shown). The pad 604 may also be coupled to a first side of the resistance block (RLIMIT) 606 and a first input of the amplifier 612. A second side of the resistance block (RLIMIT) 606 may be coupled to a source of the transistor 608 and a second input of the amplifier 612. A gate of the transistor 608 may be coupled to the power supply VCC. A drain of the transistor 608 may be coupled to a first side of the resistance block (RLOAD) 610. A second side of the resistance block (RLOAD) 610 may be coupled to ground.

The output of the amplifier 612 may be coupled to the register 614. The register 614 may be clocked by the amplifier 612. The register 612 may be configured to generate a signal (e.g., EVENT_OVER). The signal EVENT_OVER may be configured as a fault causing event signal. In one example, the signal EVENT_OVER may be configured as an over-voltage event signal.

Figure 7:
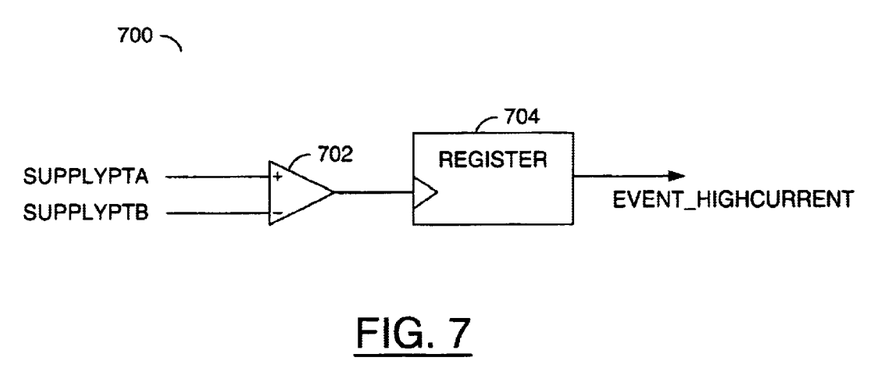
FIG. 7 is a block diagram of a high current detect circuit.

Referring to FIG. 7, a circuit (or system) 700 for detecting high currents is shown. The circuit 700 may be configured to detect and store high current fault conditions. The circuit 700 generally comprises a comparator 702 and a register 704. The comparator 702 may present a signal to the register 704 in response to a signal (e.g., SUPPLYPTA) and a signal (e.g., SUPPLYPTB). The register 704 may be clocked by the comparator 702. The register 704 may be configured to generate (and/or store) a signal (e.g., EVENT_HIGHCURRENT). The comparator 702 may contain hysteresis such that when a particular monitoring point (e.g. the signal SUPPLYPTA or SUPPLYPTB) is sufficiently higher or lower in voltage than another point (e.g., the other signal SUPPLYPTA or SUPPLYPTB), the comparator 702 may switch states.

Hysteresis is the measure for a comparator for which an input threshold changes as a function of the input (or output) level. More specifically, when the input passes the input threshold, the output changes state and the input threshold is subsequently reduced so that the input must return beyond the initial input threshold before the output of the comparator changes state again.

By switching states, the comparator 702 may indicate a possible fault condition. A second comparator (not shown) may also be implemented with opposite polarity to detect a power supply difference of the opposite polarity from the comparator 702.

The microcontroller application 200 may allow firmware to poll the event detect lines as desired to determine if a potentially hazardous event has occurred. However, coupling a high current to a pin may lead to an over/under-voltage. Therefore, the circuits 300, 400, 600 and 700 may be implemented to detect over/under-voltage stress as well.

Alternatively, capacitive coupling may also be configured to detect events for a particular fault causing implementation. Implementing devices not normally found on integrated circuits may enable significant additional options. For example, a zener diode may be implemented to detect over-voltages. Such approaches may be viable for state-machine type implementations in addition to microcontroller implementations. Various known implementations of the over/under-voltage detection circuits may be implemented to meet the design criteria of a particular implementation.

The process 100 may detect over-stresses to increase the robustness of device operation. The process 100 may allow a device to be either directly reset on a disturbance event, or to be monitored and take appropriate recovery action when events occur. The process 100 may also provide flexibility in response to stress conditions.

Registering and monitoring the fault causing events may enable such an appropriate configuration. For example, a mouse user may want to reset completely and start over. A keyboard user may want to flush current keyboard buffers, reload default state values, and continue. A user of an external flash memory may need to check the integrity of previous data writes. In addition, the detection capability of the process 100 may allow a device to take any appropriate recovery (or reset) action when stress events are occurring, or even when such events do not actually cause a device failure. For example, a stress event may indicate that environmentally harsh conditions are beginning, such that a back-up operation may need to be started immediately.

The process 100 may detect and store stress event occurrences. The process may be implemented to detect over/under-voltage conditions. The process 100 may enable a microcontroller to monitor stress events and respond by taking appropriate action. The process 100 may allow devices to incorporate a method that responds to a detected stress event.

While the invention has been particularly shown and described with reference to the preferred embodiments thereof, it will be understood by those skilled in the art that various changes in form and details may be made without departing from the spirit and scope of the invention.

What is claimed is:

1. A method for circuit recovery from overstress conditions, comprising the steps of:
   (A) detecting an event;
   (B) storing said event;
   (C) comparing said stored event to a plurality of event types stored in a table to determine if said event is a first predetermined type or a second predetermined type; and
   (D) resetting a device when said event is a said first predetermined type and providing recovery when said event is a said second predetermined type.

2. The method according to claim 1, wherein step (D) further comprises:
   determined an appropriate recovery, wherein said recovery is selected from the group consisting of (i) self checking, (ii) issuing warnings, (iii) performing back-up operations, and (iv) shutting-down.

3. The method according to claim 2, wherein said recovery further comprises resetting.

4. The method according to claim 1, wherein step (D) further comprises:
   performing recovery steps before or in place of a full reset.

5. The method according to claim 1, wherein step (D) further comprises:
   determined if resetting or providing recovery is necessary.

6. The apparatus according to claim 1, wherein steps (A) and (D) are performed by processor.

7. An apparatus comprising:
   moans for detecting an event;
   means for storing said event;
   means for comparing said event to a plurality of event types stored in a table to determine if said event is a first predetermined type or a second predetermined type; and
   means for (i) resetting a device when said event is a said first predetermined type and (ii) providing recovery when said event is a said second predetermined type.

8. An apparatus comprising:
   a detection circuit configured to generate a signal having on event condition; and
   a storage circuit configured to store said event;
   a table configured to store a plurality of event types; and
   a circuit configured to (i) reset when said event condition is a first predetermined type and (ii) implement recover action when said event condition is a second predetermined type, wherein said first and second predetermined types are determined in response to a comparison of said event to said plurality of event types stored in said table.

9. The apparatus according to claim 8, wherein said circuit is further configured to determine an appropriate recovery action.

10. The apparatus according to claim 8, wherein said circuit comprises a microprocessor.

11. The apparatus according to claim 8, wherein said detection circuit comprises an over/under-voltage detection circuit.

12. The apparatus according to claim 8, wherein said detection circuit comprises a high current detection circuit.

13. The apparatus according to claim 8, wherein said detection circuit comprises a noise coupling detection circuit.

14. The apparatus according to claim 8, wherein said detection circuit comprises:
   an over-under-voltage detection circuit;
   a high current detection circuit; and
   a noise coupling detection circuit.

* * * * *